United States Patent [19]
Tietje

[11] Patent Number: 5,341,903
[45] Date of Patent: Aug. 30, 1994

[54] FLUID CONDUIT ARRANGEMENT
[75] Inventor: Mark E. Tietje, Batavia, Ill.
[73] Assignee: Caterpillar Inc., Peoria, Ill.
[21] Appl. No.: 937,069
[22] Filed: Aug. 31, 1992
[51] Int. Cl.$^5$ ............................................. F16D 55/02
[52] U.S. Cl. .............................. 188/71.6; 188/264 D; 188/264 F
[58] Field of Search ...................... 188/2 R, 71.5, 71.6, 188/152, 264 D, 264 E, 264 F, 264 P; 192/4 A

[56] References Cited
U.S. PATENT DOCUMENTS
4,140,198 2/1979 Chamberlain ................. 188/264 D FOREIGN PATENT DOCUMENTS
0076387 4/1983 European Pat. Off. ........ 188/264 P
2079393 1/1982 United Kingdom ............ 188/264 P Primary Examiner—Robert J. Oberleitner
Assistant Examiner—Chris Schwartz
Attorney, Agent, or Firm—William C. Perry

[57] ABSTRACT

In present day construction equipment, it is common practice to provide braking capability for each driven axle. The conduits that deliver the pressurized actuating fluid to the brake assemblies are normally mounted in close proximity to existing framework to protect them from contact with debris and other structure common to the environment in which a construction vehicle operates. In some of the more severe environments, this type of mounting does not afford the conduits adequate protection, and they have been known to suffer damage. The area most prone to damage in this situation is the area around the axle assembly where the conduits split to communicate the pressurized fluid to each brake assembly associated with each end of the axle. In the present invention, a fluid conduit assembly is provided that is mounted entirely within the internal cavity defined by the axle housing. A single connecting means communicates pressurized fluid into the axle housing whereupon it is internally directed to the brake assemblies on each end of the axle housing. Since the fluid conduit assembly is mounted entirely within the axle housing, it is protected at all times.

8 Claims, 3 Drawing Sheets

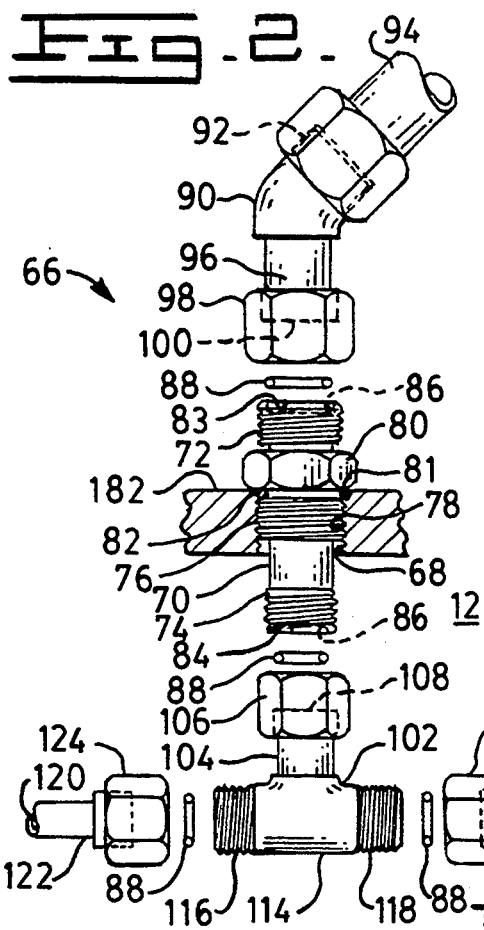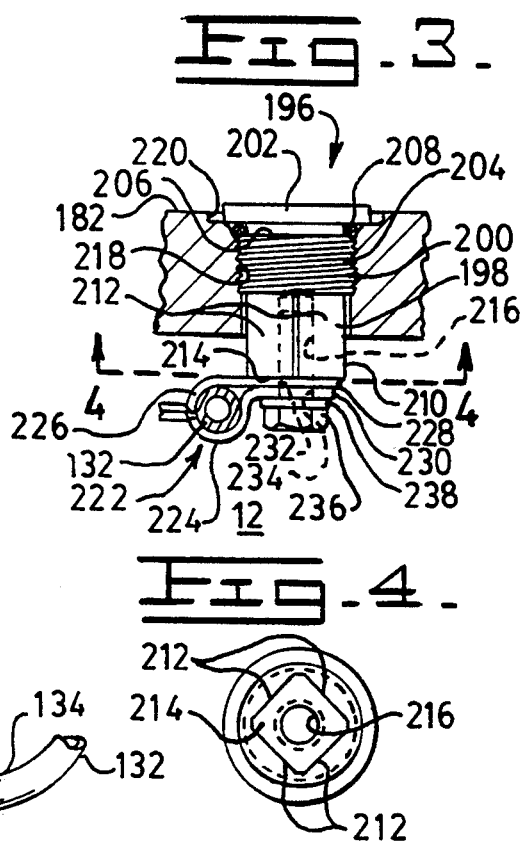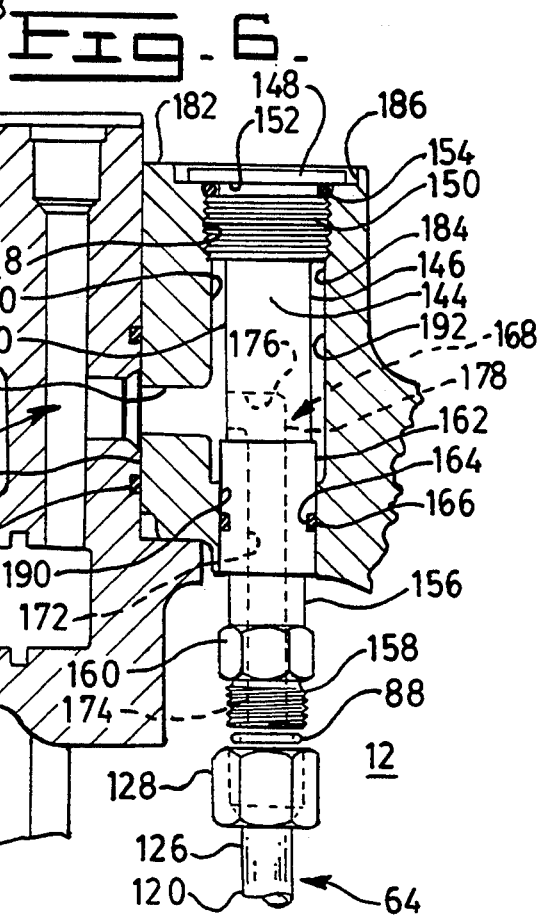

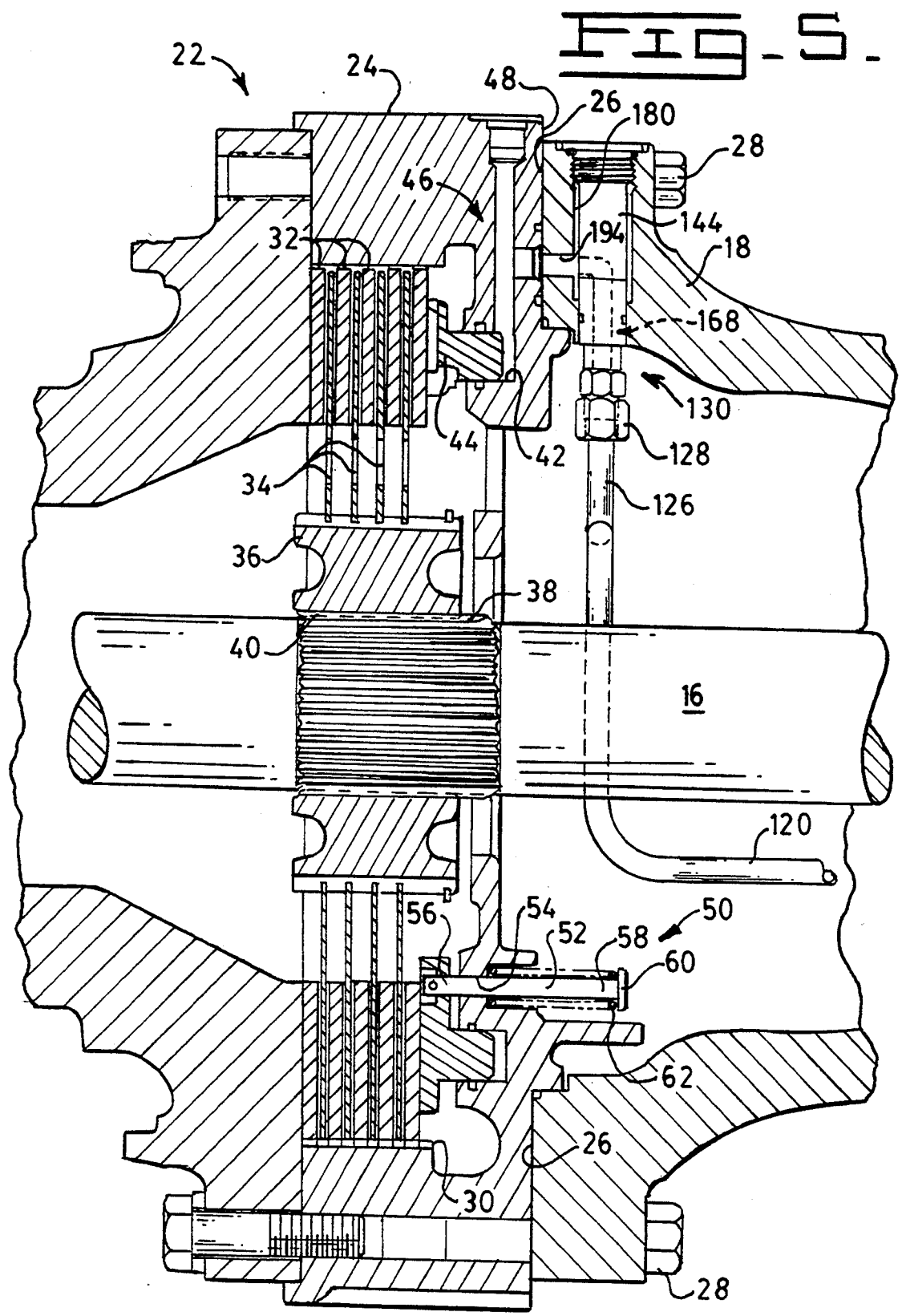
Fig_5.

FLUID CONDUIT ARRANGEMENT

TECHNICAL FIELD

This invention relates to a fluid conduit arrangement and more particularly to a fluid conduit assembly that is mounted internally within an axle housing.

BACKGROUND ART

In the operation of conventional construction equipment it is common to provide braking capabilities to both the front and rear axle. In most instances, operation of the brake, either for actuation or release, is dependent upon application of pressurized fluid to the respective brake assemblies. The fluid is normally pressurized by an engine driven pump that is located in the engine compartment and fluid is delivered to the respective brake assemblies by fluid conduits. The fluid conduits may take the form of flexible hoses or tubular conduits that are made of preformed metal. It is common in the routing of these conduits to have a portion thereof exposed to the environment along at least a portion of their extent. In these particular areas, it is imperative that the conduits are afforded some form of protection from damage that may be caused by contact with foreign objects around which the vehicle must operate. In many instances, the frame itself provides sufficient protection for the conduits. An area of rather high vulnerability exists in the region of the rear axle housing to which the brake assemblies are secured. On many vehicles, such as wheel loaders for example, the routing of the conduits that extend to the rear axle of the machine generally follow the vehicle frame to a location above the rear axle housing. A pair of conduits may then be directed to each end of the axle to a point where they are connected to each brake assembly. Each conduit is normally secured in close proximity to the top of the axle housing so that they may be protected from rocks and other debris over which the vehicle must traverse.

In some instances, the terrain is so harsh that this particular mounting does not afford the conduits adequate protection and the conduits are subject to damage. One such instance occurs when the routing as described above is utilized on a landfill compactor. The compactor travels over tons of loose debris that sometimes becomes packed around the axles. As the machine travels over the debris in this condition, the motive force of the vehicle moving against the debris has been known to apply enough force on the conduits, and their connection to the respective brake assemblies, to damage them.

The present invention is directed to overcoming one or more of the problems as set forth above.

DISCLOSURE OF THE INVENTION

In one aspect of the present invention, a fluid conduit assembly is provided that includes an axle housing that has a pair of opposing end portions and a plurality of drive components housed therein for relative rotation therewithin. A pair of brake assemblies are secured to each of the opposing ends of the axle housing and are selectively actuatable to brake the rotation of the drive components. A fluid conduit assembly that is located entirely within the axle housing is also included and has an inlet located within the axle housing and a pair of opposing end portions that are engaged with the respective brake assemblies. A means for connecting the conduit assembly to a source of pressurized fluid located externally of the axle housing is provided for connection to the inlet of the fluid conduit for delivery of the fluid to the brake assemblies for selective actuation thereof.

With a fluid conduit assembly as set forth above, the entire conduit assembly in the area of the axle housing is afforded protection from contact with debris by virtue of its internal positioning within the axle housing. Further, the connecting means permits pressurized fluid to enter the axle housing at a single location. Once the fluid has entered the axle housing, the connecting means then directs the flow to the brake assemblies on opposite ends of the axle. This not only increases protection for the conduits between the axle and the brake assemblies but also affords overall simplification for the means by which the pressurized fluid is delivered to the axle from the engine driven pump.

BRIEF DESCRIPTION OF THE DRAWINGS

FIG. 2 is an diagrammatic, enlarged view of the area indicated at 2 on FIG. 1 that shows the various components in exploded relationship to each other;

FIG. 3 is a diagrammatic sectional view taken along lines 3—3 as indicated in FIG. 1;

FIG. 4 is a diagrammatic sectional view taken along lines 4—4 as indicated in FIG. 3;

FIG. 5 is a diagrammatic sectional view taken along lines 5—5 as indicated in FIG. 1; and FIG. 6 is a diagrammatic, enlarged view of the area indicated at 6 in FIG. 5.

BEST MODE FOR CARRYING OUT THE INVENTION

Figure 1:
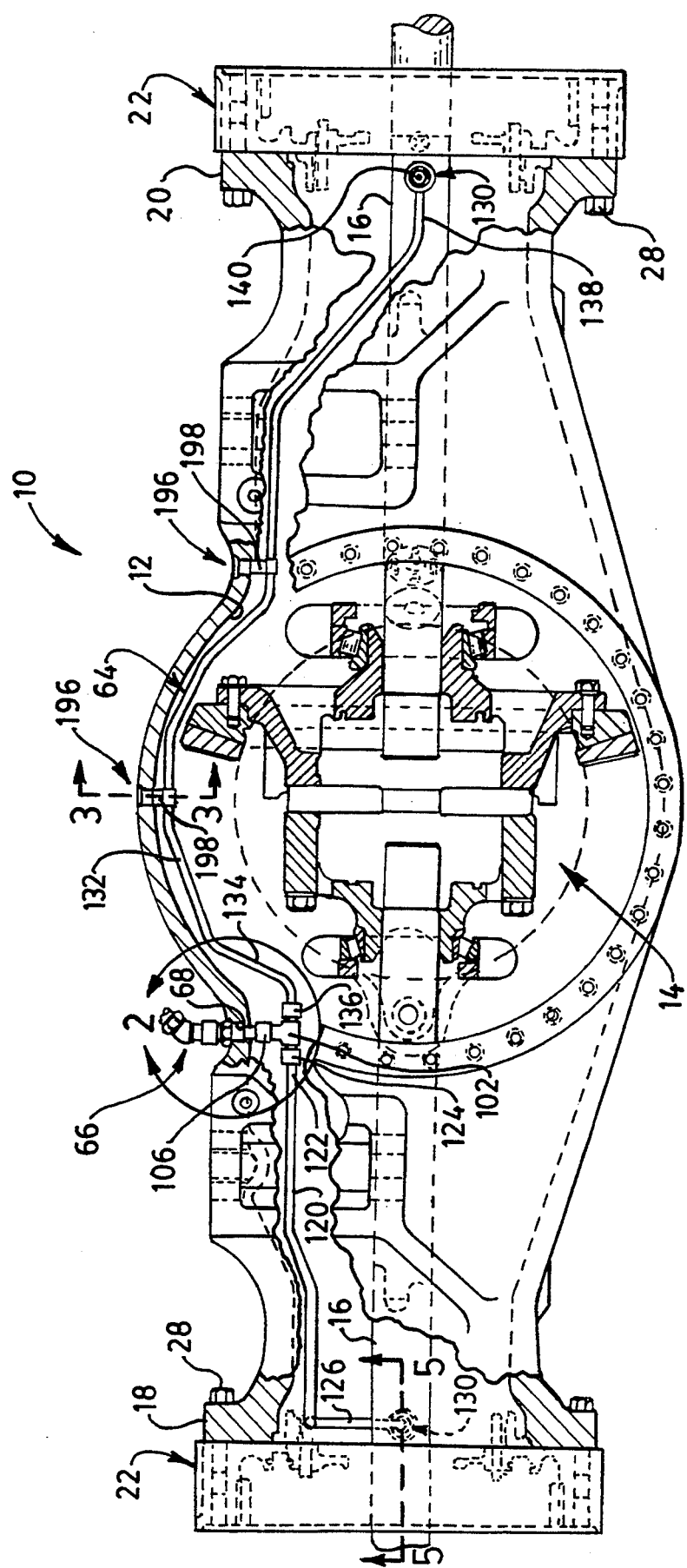
FIG. 1 is a diagrammatic, partially sectioned view of an axle housing that embodies the principles of the present invention.

Turning now to the drawings, and more particularly to FIG. 1, an axle housing 10 is shown that defines an internal cavity 12 that houses a plurality of drive components. The drive components include a differential assembly 14 that is driven by input from a drive shaft (not shown) that is in turn driven by the engine and transmission of the vehicle. A pair of axle shafts 16 extend outwardly from opposing ends of the differential assembly 14 to provide rotation to a pair of wheel assemblies (not shown) that are supported on opposing end portions 18 and 20 of the axle housing. Each axle shaft 16 extends through a pair of brake assemblies 22 that are also attached to each of the opposing end portions 18 and 20 of the axle housing. Each brake assembly is splined to the respective axle shafts to selectively prevent their rotation in a manner to be described in more detail hereinafter.

As can best be seen in FIG. 5, the brake assemblies 22 are shown in greater detail. Since both ends of the axle housing are identical, it is to be understood that only one end portion will be described in detail with common components being identified by the same reference numeral where applicable. Each brake assembly is contained within a second, stationary housing 24 that is attached to an axially directed end face 26 defined by each end portions 18 and 20 of the axle housing by any suitable releasable connector such as a plurality of bolts 28. Each brake housing 24 defines an internal spline 30 that engages a first plurality of brake plates 32. Interleaved between the first brake plates are a second plurality of brake plates 34 that are splined to a brake hub 36 about their inner diameter. The brake hub 36 defines a plurality of external splines 38 that engages the second plurality of brake plates 34 and a plurality of internal splines 40 that are engaged with the axle shaft 16. Upon rotation of the axle shaft, the hub 36 and the second plurality of brake plates 34 are also rotated. The first plurality of brake plates 32 remain stationary due to their splined connection to the brake housing 24.

The brake housing 24 also defines an axially directed annulus 42 that receives a brake piston 44. The piston is mounted for reciprocal movement within the bore and is positioned in axially adjacent proximity to the first and second brake plates 32 and 34 respectively, so that it may be moved in and out of engagement with the brake plates. The piston may be moved in an outward direction to a first position to engage the brake plates and stop their relative rotation. Movement of the piston to its first position is controlled by the application of pressurized fluid that is introduced into the annulus 42. The pressurized fluid is introduced into the bore via a fluid passageway 46 that is formed in the brake housing and extends from the annulus 42 to an axially directed end face 48 that abuts the end face 26 defined by the axle housing. A plurality of spring assemblies 50 (one shown) are attached to the piston to retract the piston from its first position within the bore, to a second or retracted position. Each spring assembly includes a rod member 52 that extends through a second axial bore 54 in the brake housing and has a first end portion 56 engaged with the brake piston. On the opposite side of the brake housing from the piston, a second end portion 58 of the rod member 52 defines an enlarged head portion 60. A spring member 62 is positioned about the rod member 52 and extends between the brake housing 24 and the enlarged head portion 60 to continually urge the piston toward the brake housing in absence of pressurized fluid within the annulus 42. While only one spring assembly is shown in FIG. 4, it is to be understood that a plurality of spring assemblies are positioned in an equidistant manner about the axle shaft 16.

The pressurized fluid that is utilized to move the brake pistons between their first and second positions is delivered within the axle housing 10 by a fluid conduit assembly 64 (FIG. 1). The fluid conduit assembly is formed of metallic tubing that is town, only utilized in the delivery of pressurized fluid and is entirely encased within the axle housing. Since there are numerous rotating components within the axle housing, the tubing has preformed angles and bends to avoid contact with these components.

The fluid conduit assembly 64 is connected to a source of pressurized fluid via a single connecting means 66 that is received within a bore 68 formed in the axle housing 10. As can be seen in FIG. 2, the connecting means includes a first, or straight connecting member 70 that is received within the bore 68 in a manner that positions a first end portion 72 thereof outside the axle housing and a second end portion 74 within the internal cavity of the axle housing. A threaded connecting portion 76 is positioned between the first and second end portions 72 and 74 of the straight connecting member 70 and is engaged with a plurality of threads 78 formed in the bore 68 to secure the straight member. An enlarged, hexagonally shaped portion 80 is positioned between the connecting portion 76 and the first end portion 72. The hexagonally shaped portion is sufficient for engagement by a wrench or the like to facilitate rotation of the straight connecting member within the bore to achieve and release the threaded engagement therebetween. An annular groove 81 is defined between the threaded connecting portion 76 and the hexagonally shaped portion 80 and receives an O-ring seal 82 that sealingly engages the bore 68. Both the first and second end portions of the straight connecting member define a plurality of male threads and a planer end face 83 and 84 respectively. Each end face further defines an annular groove 86, each of which receives an O-ring seal 88.

A second connecting member 90 that takes the form of an outer elbow has a first end portion 92 that is connected to a conduit 94 that extends from an engine driven pump (not shown). A second end portion 96 of the outer elbow supports a swivel nut 98 that is sufficient for engagement with the first threaded end portion 72 of the straight connecting member 70. The second end portion 96 of the outer elbow also forms a planer end face 100 that engages the end face 82 of the straight connecting member 70 with the seal 88 interposed between to seal the connection therebetween. While not shown, it is to be understood that the connection between the first end portion 92 of the connecting member 90 and the conduit 94 are sealed in a similar fashion.

A third connecting member, or connecting tee 102, having a generally T-shaped configuration, has a first end portion 104 that supports a swivel nut 106. The swivel nut is engageable with the second threaded end portion 74 of the straight connecting member 70. The first end portion 104 of the connecting tee 102 further defines a planer end face 108. The end face 108 of the connecting tee 102 engages the end face 84 of the second end portion 74 of the straight connecting member 70 with the seal 88 interposed therebetween to provide a sealed connection between the straight member and the connecting tee. The connecting tee further defines a second end portion 114 that in turn defines a pair of threaded end portions 116 and 118 that extend in opposing directions.

A first section 120 of the conduit assembly 64 has a first end portion 122 that is threadably connected with the threaded end portion 116 of the connecting tee by a swivel nut 124. A second end portion 126 of the first conduit section 120 is engaged in a like manner by a swivel nut 128 attached to a fluid connecting device 130 mounted to each of the end portions 18 and 20 of the axle housing 10 in a manner to be described hereinafter.

In a similar fashion a second section 132 of the conduit assembly 64 also has a first end portion 134 that is threadably engaged with the threaded end portion 118 of the connecting tee 102. A swivel nut 136 is supported by the first end portion 134 of the second conduit section to secure the connection with the connecting tee. A second end portion 138 of the second conduit section 132 supports a swivel nut 140 that engages a connecting device 130 that is mounted to the end portion 20 of the axle housing 10.

As is the case with all of the connections in the fluid conduit assembly 64, a seal member 88 is included at each point of connection to prevent leakage of the fluid.

Referring to FIG. 6, it can be seen that the fluid connecting device 130 includes a connecting stem 144 that has a first end portion 146 that terminates in an enlarged, disc-shaped head portion 148. A threaded portion 150 is defined on the first end portion 146 in inwardly adjacent relationship to the head portion 148. An annular groove 152 is positioned between the head and the threaded portion and is sufficient for receiving an O-ring seal 154. The connecting stem 144 has a second end portion 156 that terminates in a threaded portion 158 that defines a plurality of male threads. A means 160 for rotating the connecting stem is positioned in inwardly adjacent relationship to the threaded end portion 158 and in the disclosed embodiment is hexagonally shaped to accommodate a wrench or a socket. A land 162 is formed on the connecting stem and is positioned substantially intermediately between the first and second end portions 146 and 156. The land 162 has an annular groove 164 formed thereon that is sufficient for receiving an O-ring seal 166. The connecting stem also includes an internal passageway 168 that extends from the second end portion 156 thereof to a point on the outer surface 170 of the connecting stem that is located between the land portion 162 and the first end portion 146. The internal passageway 168 includes a first, axially directed passage 172 that has a first end portion 174 that opens onto an end face 176 of the second end portion 156 of the connecting stem 144. A second, radially directed passage 176 extends between a second end portion 178 of the axial passage 172 and the outer surface 170 of the connecting stem 144 at a generally central region thereof.

The connecting stem 144 is positioned within a mounting bore 180 that extends between an outer surface 182 of the axle housing and the internal cavity 12. The mounting bore 180 has a first end portion 184 that defines an enlarged counterbore 186 at its interface with the outer surface 182 of the axle housing. The counterbore 186 is sized to received the enlarged head portion 148 of the connecting stem 144 so that the head portion is generally flush with the outer surface 182 of the axle housing when the connecting stem is mounted within the mounting bore. The mounting bore has a threaded portion 188 that is positioned just inwardly of the counterbore and is engageable with the threaded portion 150 of the connecting stem 144 to secure the connecting stem within the mounting bore. A second end portion 190 of the mounting bore 180 defines a generally uniform diameter and opens onto the internal cavity 12 of the axle housing 10. This portion of the mounting bore receives the land portion 162 of the connecting stem. The O-ring seal 166 is positioned between the two components to provide a sealing engagement therebetween. The second end portion 156 of the connecting stem 144 is positioned to extend beyond the second end portion 190 of the mounting bore 180 into the internal cavity 12. The threaded portion 158 of the second end portion 156 of the connecting stem receives the swivel nut 128 that is supported on the second end portion 126 of the first conduit sections 120.

An annulus 192 is defined by the mounting bore 180 that extends between the threaded portion 188 and the second end portion 190 of the bore. An exhaust port 194 that has an orientation normal to that of the mounting bore is positioned for communication between the mounting bore and the end face 26 defined by the respective end portions 18 and 20 of the axle housing. The exhaust port 194 is positioned between the annulus 192 of the mounting bore 180 and the fluid passageway 46 defined in the brake housing 24 as previously described. An O-ring seal 195 is positioned about the respective exhaust part 194 and fluid passageway 46 at the interface between the brake housing 24 and the end face 26 of the axle housing. This prevents leakage of fluid as it passes between the respective housings.

Referring now to FIGS. 1, 3 and 4, it can be seen that the distance between the connecting tee 102 and the connecting stem 144 associated with the respective end portions 18 and 20 of the axle housing can be rather large. This is particularly the case with the second conduit section 132. In order to properly support the length of the respective conduit sections, a mounting apparatus 196 is provided to secure the conduit section to the inside of the axle housing 10. The mounting apparatus 196 includes a plurality mounting studs 198, each of which have a first end portion 200 that forms a generally flat, disc-shaped head member 202. A threaded portion 204 is positioned on the mounting stud in inwardly adjacent relationship to the head member 202. An annular groove 206 is positioned about the mounting stud between the head member 202 and the threaded portion 204 and is sufficient to receive an O-ring seal 208. As can best be seen in FIG. 4, a second end portion 210 of the mounting stud is generally square in configuration and defines a plurality of opposing flat portions 212. The second end portion 210 terminates in a generally planer end face 214 onto which a threaded bore 216 opens.

Each mounting stud 198 is received within one of a plurality of threaded bores 218 that are selectively positioned in the axle housing 10. Each threaded bore 218 defines an enlarged counterbore 220 at its interface with the outer surface 182 of the axle housing. The mounting studs are positioned with the threaded bores 218 with the head member 202 in generally flush relation to the outer surface 182 of the axle housing 10 and the second end portion 210 extending into the internal cavity 12 of the axle housing.

A clamping means 222 is provided to secure the fluid conduit section 132 to the mounting stud 198. The clamping means 222 includes a bracket member 224 that has a conduit receiving portion 226 that is positioned about the section of conduit. A pair of parallel flange portions 228 and 230 extend from the conduit receiving portion 226 and define respective apertures 232 and 234 that are positioned for alignment with one another. The aligned apertures 232 and 234 receive a fastening device such as a bolt 236 and washer 238. The bolt 236 is in turn, engageable with the threaded bore 216 of the mounting stud 198 to secure the clamping means 222 and the conduit section 132 to the mounting stud.

INDUSTRIAL APPLICABILITY

The fluid conduit assembly 64 as described above must be installed during the assembly of the axle housing 10 or at a time when access to the internal cavity 12 is readily available. Beginning with the connecting means 66 (FIG. 2), it can be seen that the straight connecting member 70 may be inserted into the bore 68 formed in the upper portion of the axle housing until the respective threaded portions 76 and 78 engage each other. The hexagonal portion 80 that is formed on the straight connecting member is positioned outside the axle housing and may be engaged by a wrench or other appropriate tool to rotate the straight connecting member until threaded engagement is achieved. When the straight connecting member is securely mounted, the O-ring seal 82 is placed in contact with the housing to create sealed connection. The outer elbow 90 may then be mounted to the first end portion 72 of the straight connecting member 70 through engagement of the swivel nut 98 with the first end portion 72. Moving to the internal cavity 12, the swivel nut 106 supported by the first end portion 104 of the connecting tee 102 may be connected with the second end portion 74 of the straight connecting member 70 to complete the assembly of the connecting means.

Installation of each of the fluid connecting devices 130 begins with the insertion of each respective connecting stems 144 into the respective mounting bores 180 positioned on each end 18 and 20 of the axle housing. The connecting stem 144 is inserted into the mounting bore 180 from a location outside the axle housing. The second end portion 156 of the connecting stem, and more particularly the hexagonal portion 160 formed thereon, will initially extend into the internal cavity a distance sufficient to be engaged by a wrench or other appropriate tool. Rotation of the connecting stem from within the internal cavity will create engagement between the respective threaded portions 150 and 188 of the connecting stem and mounting bore. Upon completion of the threaded engagement, the disc-shaped head portion 148 of the connecting stem 144 is positioned for nesting engagement within the counterbore 186 and flush with the outer surface of the axle housing. Being so positioned, engagement of the head member by any tool in an attempt to remove the stem member from engagement with the mounting bore is precluded. The land 162 and the seal 166 mounted thereon, are positioned within the second end portion, or uniform portion 190 of the mounting bore 180. The seal 166 works in conjunction with the seal 154 positioned between the respective first end portions 146 and 184 of the connecting stem 144 and mounting bore 180 to seal the annulus 192 positioned therebetween. The internal passageway 168 extends within the connecting stem from the second end portion 156 to open onto the outer surface 170 of the connecting stem in the region of the annulus.

With the fluid connecting devices 130 being secured in place in the opposing end portions of the axle housing, the conduit assembly 64 may be attached. The swivel nut 124 supported on the first end portion 122 of the first conduit section 120 is threadably engaged with the threaded end portion 116 of the connecting tee 102. The swivel nut 128 on the second end portion 126 of the first conduit section 120 is sealably connected to the second end portion 156 of the connecting stem 144 fluid connecting device 130. In a similar fashion, the second conduit section 132 is secured between the threaded portion 118 of the connecting tee 102 and the fluid connecting device 130 associated with the opposite end portion 20 of the axle housing.

In order to provide proper support for the second conduit section 132, the mounting studs 198 are positioned along the length of the conduit. Like the connecting devices, the mounting studs are inserted into their respective mounting bore 218 from a point outside the axle housing. The second end portion 210 of the mounting stud may be engaged by a wrench from within the internal cavity to achieve proper threaded engagement of the mounting stud within the bore. When secured, the head portion 202 of the mounting stud is nested within the counter bore 220 so as to be generally flush with the outer surface 182 of the axle housing. Being disc-shaped, the head portion 202 may not be grasped for removal from the mounting bore 218 from outside the axle housing.

Upon completion of the assembly of the fluid conduit assembly 64 within the axle housing, the pressurized fluid from a source outside the axle housing may now be delivered to selectively actuate the brake assemblies 22.

The fluid is directed into the axle housing at a single location via the connecting means 66. The connecting tee 102 splits the flow between the first and second conduit sections 120 and 132. Each conduit section directs flow of the fluid to the internal passageway 168 formed in the connecting device 130. The fluid flows through the internal passageway and exits the connecting device in the region of the sealed annulus 192. From the annulus 192, the fluid is directed through the exhaust port 194 and the passageway 46 formed in the brake housing 24, to the annulus 42. Once the fluid is communicated to the annulus 42, it acts against the brake piston 44 to selectively urge the piston into engagement with the brake plates 32 and 34 to brake the rotation of the drive components.

With a fluid conduit assembly 64 as set forth above, pressurized fluid may be selectively delivered to the brake assemblies 22 attached to the end portions of an axle housing without the risk of damage from contact with foreign objects or debris over which a vehicle must traverse. Further, since the fluid connecting devices 130 and mounting studs 198 have head portions that are recessed and are positioned in generally flush relationship with the outer surface 182 of the housing, they may not be engaged for removal from a point outside the axle housing. If this were not the case and an individual unfamiliar with the axle design were to attempt removal of either component, the torque applied to remove the respective components from their bores would subsequently be applied to the conduit sections. This would very likely cause severe damage within the axle housing.

Finally, it must be noted that all of the various fluid connection components mounted within the axle housing, that is the fluid connecting device 130, the straight connecting member 70 and the mounting studs 198, are connections that are common in the automotive industry. Each of these sealed connections conform to the specifications set forth by the Society of Automotive Engineers (SAE). This type of connection requires only basic machining procedures. This not only saves time and expense in manufacturing, it also is critical to the integrity of the axle housing as a structure. Since most axle housings are formed from a casting, they are very sensitive to certain machining processes, such as welding, that might otherwise be used to attach one of the components to the axle housing. Since welding is known to create stress risers within a casting such as the axle housing, the only machining required to mount the fluid conduit assembly is the drilling and tapping of a plurality of standard SAE mountings, virtually no undue stress is applied to the axle housing.

Other aspects, objects and advantages of this invention can be obtained from a study of the drawings, the disclosure and the appended claims.

I claim:

1. A fluid conduit assembly, comprising:
   an axle housing having a pair of opposing end portions and a plurality of drive components housed therein for relative rotation therewithin;
   a pair of brake assemblies, each of which is secured to an opposing end portion of the axle housing, said brake assemblies being selectively actuatable to brake the rotation of said drive components;
   a fluid conduit assembly located within the axle housing and having a pair of opposing end portions that are engaged with the respective brake assemblies, said fluid conduit assembly being positioned entirely within the axle housing; and means for connecting the conduit assembly to a source of pressurized fluid located externally of the axle housing, said connecting means engaging said axle housing at a single location to provide communication of pressurized fluid to the brake assemblies for selective actuation thereof.

2. The fluid conduit assembly as set forth in claim 1 wherein the connecting means further includes:
   a first member having a first and second end portion and a connecting portion, said connecting portion being positioned between said end portions and being threadably engaged with a bore formed in the axle housing in a manner to position the first end portion outside the axle housing and the second end portion within the axle housing, each of said end portions defining an end face sufficient for mounting a seal member;
   a second member having a first end connected to the external source of pressurized fluid and a second end portion that is connected to the first end portion of the first member; and
   a third member having a first end portion connected to the fluid conduit assembly and second end portion connected to the second end portion of the first member.

3. The fluid conduit assembly as set forth in claim 2 wherein the third member is a T-shaped member and the second end portion thereof defines a pair of threaded end portions that are positioned to extend in opposite directions and are secured to the fluid conduit assemblies by a pair of swivel nuts that are connected to the conduit assembly, 4. The fluid conduit assembly as set forth in claim 3 wherein the conduit assembly has a first section that extends from one of the threaded end portions of the third member to one of the brake assemblies and a second section extends from the other threaded end portion to the other of the brake assemblies, said conduit assemblies each being formed of metallic hydraulic tubing that includes a plurality of predetermined bends and angles so that the conduit assembly will not interfere with the rotating drive components.

5. The fluid conduit assembly as set forth in claim 2 wherein the second end portion of the first member includes a generally planar end face having an annular groove defined therein that is sufficient for receiving an O-ring seal, said second end portion of the first member being engaged with the first end portion of the third member with the O-ring seal positioned therebetween to provide a sealed connection between the first and third members.

6. The fluid conduit assembly as set forth in claim 2 wherein the first end portion of the first member includes a generally planar end face having an annular groove defined therein that is sufficient for receiving an O-ring seal, said first end portion of the first member being engaged with the second end portion of the second member with the O-ring seal positioned therebetween to provide a sealed connection between the first and second members.

7. The fluid conduit assembly as set forth in claim 1 wherein each brake assembly further includes:
   a stationary housing that is secured to an end portion of the axle housing;
   a plurality of first plate members non-rotatably engaged with the stationary housing;
   a plurality of second plate members mounted within the stationary housing for rotation with the drive components, said second plate members being interleaved between said first plate members; and
   a piston member selectively moveable to a first position wherein it is urged, under fluid pressure, into engagement with the first and second plate members to stop the rotation of the drive components, and a second position wherein the piston member is moved away from engagement with the plate members in absence of fluid pressure being applied thereto.

8. A fluid conduit assembly, comprising:
   an axle housing having a pair of opposing end portions and a plurality of drive components housed therein for relative rotation therewithin;
   a pair of brake assemblies, each of which is secured to an opposing end portion of the axle housing, said brake assemblies being selectively actuatable to brake the rotation of said drive components;
   a fluid conduit assembly located within the axle housing and having a pair of opposing end portions that are engaged with the respective brake assemblies, said fluid conduit assembly being positioned entirely within the axle housing; and
   means for connecting the conduit assembly to a source of pressurized fluid located externally of the axle housing, said connecting means engaging said axle housing at a location that is remote from respective brake assemblies to provide communication of pressurized fluid to the brake assemblies for selective actuation thereof.

* * * * *